United States Patent Office 3,541,437
Patented Nov. 17, 1970

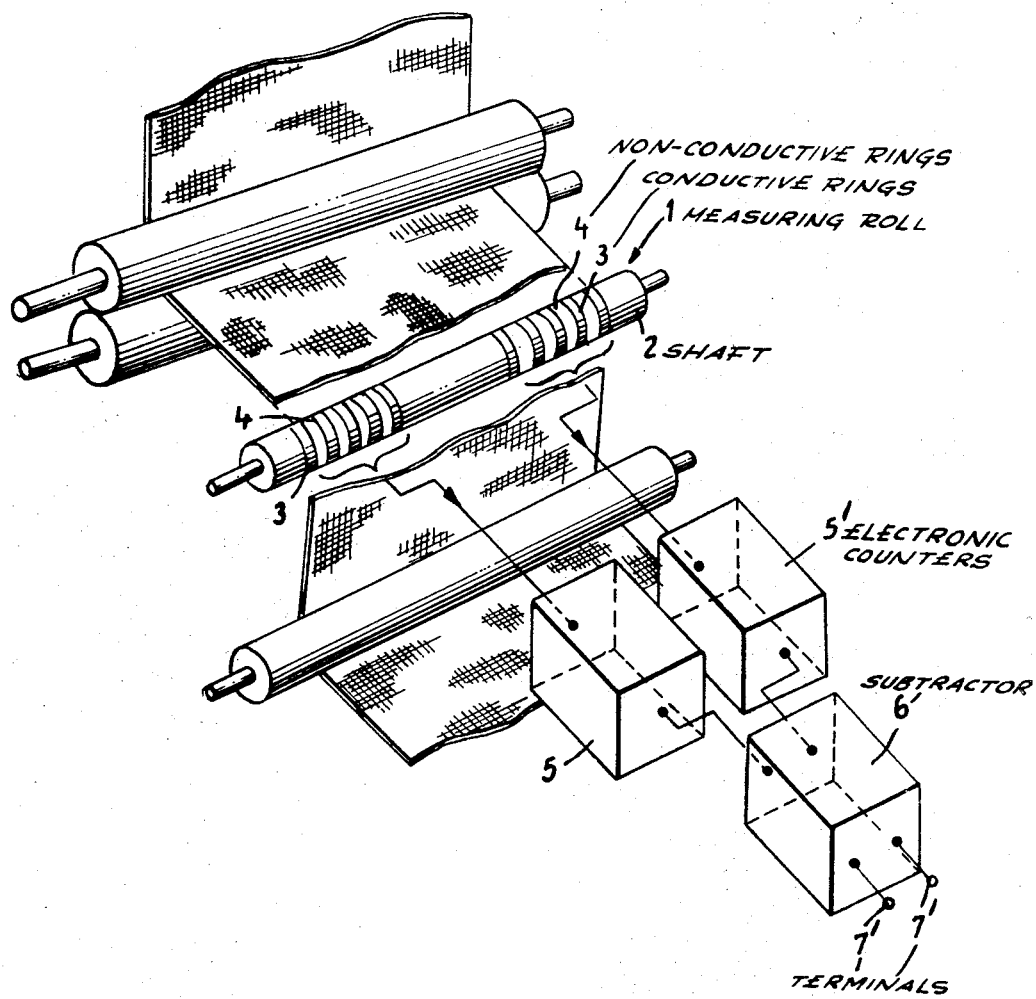

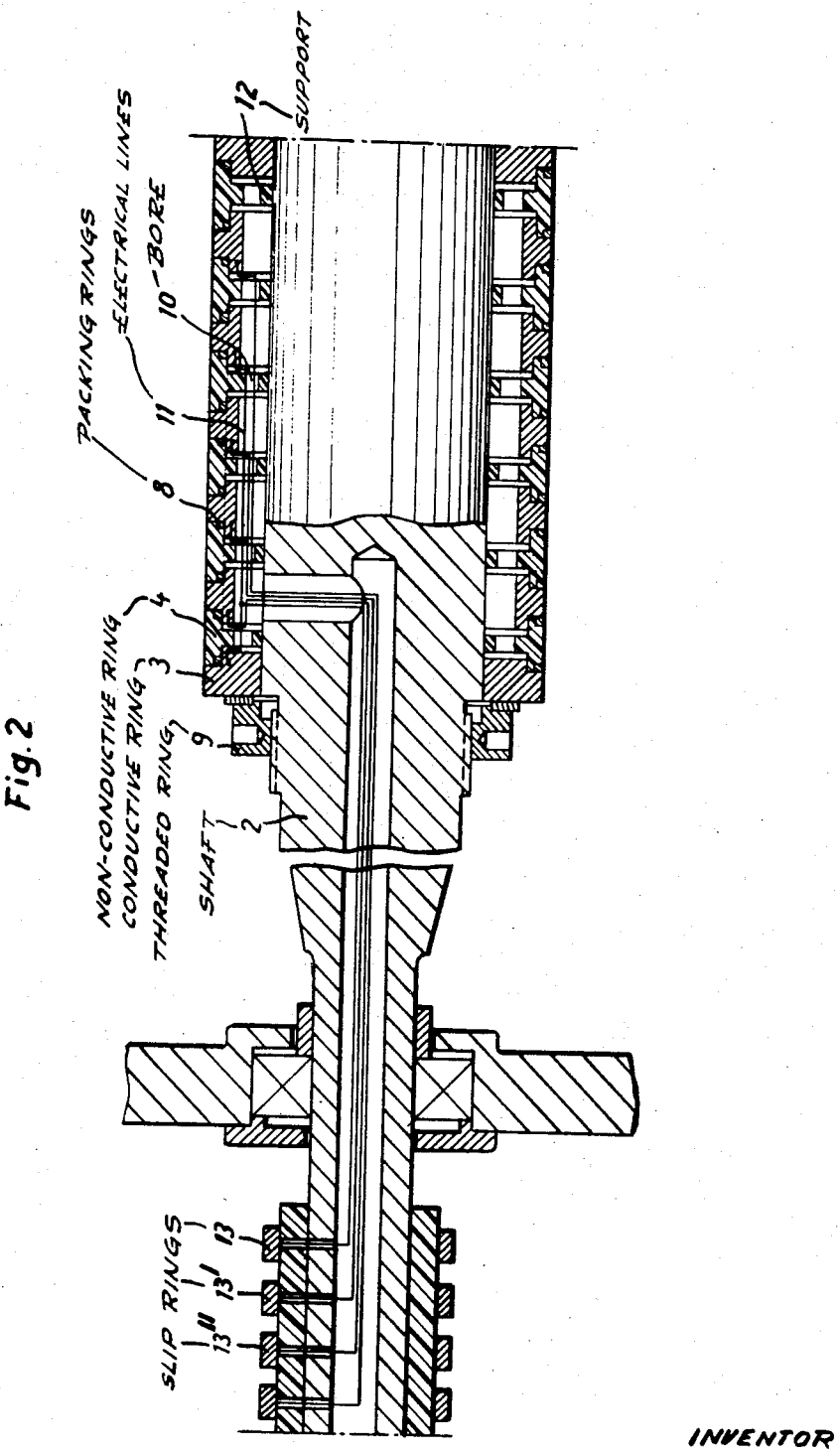

3,541,437
APPARATUS FOR DETERMINING THE LATERAL DEVIATION FROM THE CENTER OF A BREADTH PASSING A MACHINE
Karl-Heinz Ahrweiler, Krefeld, Germany, assignor to Maschinenfabrik Eduard Kuesters, Krefeld, Germany
Filed July 11, 1967, Ser. No. 652,541
Claims priority, application Germany, Oct. 31, 1966, K 60,593
Int. Cl. B65h 25/02; G01b 5/00; G01r 27/02
U.S. Cl. 324—65                                                         1 Claim

ABSTRACT OF THE DISCLOSURE

A damp or wet textile breadth or the like passes over a roll having axially interspaced electrically conductive rings separated by insulation and of which alternate rings are connected to a common conductor and the others are connected to individual conductors on both sides of the roll's center. An electric potential is applied to the common conductor and to each individual conductor so that the passing breadth when bridging and unbridging the rings causes pulse-like opening and closing of the respective circuits. An imbalance of the circuit open and closing pulses on opposite sides of the roll center is used to readout a breadth deviation signal.

---

The present invention relates to a method and means to determine the lateral deviation from the center of a breadth passing a machine and being electrically conductive.

Means are already known which are mechanically scanning the position of such breadths by means of suitable sensors contacting the breadth edges the deflections of said sensors being used to determine breadth position. The sensors are actually mounted on frames extending into a transverse direction towards the breadth and may be adjusted with respect to said frames to various breadths by lateral displacement.

With means of this type problems will arise, due to inertia of the mechanical scanning elements, as soon as rapidly passing breadths subject to constant width changes, such as elastic fabrics, are to be scanned. When breadths of varying widths are processed, necessary mechanical adjustment of the sensors also results in high adjustment labor costs and time.

To avoid these handicaps which are connected with the means already known, it is intended to provide a means which will be able to follow the changes of breadth position almost without inertia and which does not require any adjustment to varying breadth widths. Deviation of breadth position from a fixed point, for instance, in the center of the breadth path, is to be recorded as an electric variable and to influence corresponding control processes.

For this end the present invention provides for a scanning means on the breadth path said means being a return roll, gliding roll, or similarly designed scanning means extending throughout the width of the breadth. Said measuring roll is alternately composed of conductive and non-conductive discs or rings which are threaded on a shaft while being insulated with respect to said shaft. It will even be possible not to design the entire shaft in this way but to only compose the end parts of rings if possible with a view to expected changes in position and width variations of the breadth.

The shaft supports a set of slip rings. Each second conductive ring of the measuring roll is connected to a common slip ring whereas the others are connected to one slip ring each. The slip rings in their turn are connected to an electronic counting means the purpose of which will be described below. Between two adjacent rings there is an electric potential.

Textile and paper breadths subject to a processing step—and the present invention is preferably intended for such breadths—do only have a certain conductivity due to their moisture contents; they are, therefore, in a position to electrically bridge the space between two adjacent conductive rings when the space is filled by a non-conductive plastic ring. As soon as the edge of a breadth moving into a slanting direction is contacting another conductive ring, resistance between said new ring and the last ring previously covered by the breadth and having a potential with respect to the same is suddenly reduced resulting in a pulse like voltage reduction. This will always be the case when the breadth is contacting another conductive ring.

If, however, the breadth releases a conductive ring, connection between said ring and its neighbor still covered is interrupted resulting in a resistance increase accompanied by a corresponding potential increase.

According to the present invention these pulses will be counted according to their positive or negative signs by an electronic counting means of a type already known per se, i.e. variations in voltage into a certain direction will always be either added or subtracted. Consequently, the counter must be able to count forwards and backwards according to the sign of each variation in voltage.

The total adjacent pairs of rings between which there is always a gap to be bridged conductively by the breadth, are divided into two groups separated as to space by a fixed point which is, for instance, located in the center of the measuring roll, the pulses of said groups being counted separately in the manner described above, thus resulting in the totals of the gaps bridged by the breadth on the right side or on the left side of the measuring roll respectively.

By means of an electronic subtractor of a type already known per se the numerical values of both sides which are in an appropriate electric form, are compared with each other. The finally resulting electric value representing the difference, is a direct measure of the deviation of the breadth from the desired position and represents an indicating or control value which may serve as the basis for subsequent control steps to influence breadth position, for instance, the control of pole changing motors of transverse flow washing machines or the control of breadth guide elements.

The present invention provides for a method and means which may be employed to any breadth width without additional adjustment.

The electric measured quantity determination allows for measuring speeds which will substantially only depend upon the limit frequency of the counting and subtracting means and will, therefore, be sufficient for breadth regulation under any condition occurring.

Finally it will be especially favorable that the method and means, although operating on an electric basis, are almost independent of the electric properties of the breadth, in particular of its specific resistance provided that the breadth will only be capable of having a certain minimum conductivity. Normally, this will be the case with breadths subject to aqueous processing which, accordingly, are always slightly wet. The arrangement responds to a variation in resistance between two adjacent rings and registers only whether the same are covered or are not covered. The absolute amount of resistance between the same is of no importance provided that a minimum pulse sufficient to release the actually very sensible counter will be produced by conductive bridging.

The drawing is an example of a construction according to the present invention.

FIG. 1 is a diagrammatic view of the measuring method.

FIG. 2 is a view of the measuring roll part of it shown as a sectional view.

In FIG. 1 the measuring roll 1 comprises a shaft 2 and conductive rings 3 and non-conductive rings 4 which have alternately been threaded onto said shaft. The conductive rings 3 are divided into two groups. By means of two suitable electronic counters 5 and 5' it is determined at how many gaps of each group between adjacent conductive rings bridging is taking place due to the wet breadth width, therefore, is conductive. In a subtractor 6 of a type already known the difference between the above values will be determined, said values being electrically represented in any appropriate form such as equidistant potential values. The resulting difference is the measure of the deviation of the breadth from the desired position. For, if the numbers of the pairs of rings on the measuring roll which are bridged by the breadth, are equal, i.e. if the breadth is symmetric to the measuring roll, the difference is zero. If the breadth tends towards one side, more gaps will be bridged on this side than on the other, and the difference is finite. But, if the breadth tends towards the other side at the same moment, the difference is the same the sign being reverse.

The difference will be available as an indicating or control value which may be taken off at the terminals 7 or 7' respectively and which may be used to control suitable displacement means of breadth position.

According to FIG. 2 the rings 3 and 4 threaded onto the shaft 2 are pressed together by means of a threaded ring 9 to form a uniform measuring roll in the shape of a roll body including intermediate packing rings 8 protecting against moisture. Either type of ring is substantially T-shaped. The ribs of the plastic rings 4 are facing the inside, include a bore at 10 for the passage of the lines 11, and are supported on the shaft 2 at 12. With the metal rings 3 the T-feet are facing the outside. They will be kept by means of the plastic rings 4 such that they are at a certain distance from the shaft 2 while two each are insulated against each other. Every second metal ring is located above a line 11 in contact with a common slip ring 13, while the remaining metal rings 3 are connected to one slip ring each 13', 13'', etc. Between each of these remaining metal rings and every second metal ring connected to a common potential there is maintained an electric voltage in each particular case. As soon as a wet breadth, when changing its width position, is contacting or releasing a conductive ring, a conductive connection will be produced or disconnected between said ring and the last metal ring just still covered. These variations in resistance between the metal rings result in pulse like voltage changes which are fed to the counters 5, 5'.

I claim:

1. A means for determining the lateral deviation from the center of electrically conductive breadth passing a machine, including a roll over which the breadth travels, said roll having a plurality of axially interspaced electrically conductive circumferential rings on both sides of its center separated by electrical insulation, a common conductor connected to alternate ones of said rings, a separate conductor for each of the other of said rings, said rings functioning as electric switches closing when covered by the breadth and opening when uncovered thereby, and electrical means connected to said conductors for detecting when said rings are not evenly covered or uncovered by the breadth on opposite sides of the center of said roll.

References Cited

UNITED STATES PATENTS

| | | | |
|---|---|---|---|
| 2,231,035 | 2/1941 | Stevens et al. | 324—61 |
| 2,653,298 | 9/1953 | McKinley | 324—65 |
| 3,278,838 | 10/1966 | Behr et al. | 324—34 |
| 3,323,699 | 6/1967 | Bricker | 324—61 X |
| 3,384,815 | 5/1968 | Lyall et al. | 324—65 |

FOREIGN PATENTS

| | | |
|---|---|---|
| 606,102 | 8/1948 | Great Britain. |
| 956,636 | 4/1964 | Great Britain. |

EDWARD E. KUBASIEWICZ, Primary Examiner

U.S. Cl. X.R.

226—45